W. A. DAVENPORT.
POSITIVE AUTOMATIC GAS SAFETY VALVE AND CONTROL.
APPLICATION FILED SEPT. 15, 1914.
1,142,676.
Patented June 8, 1915.
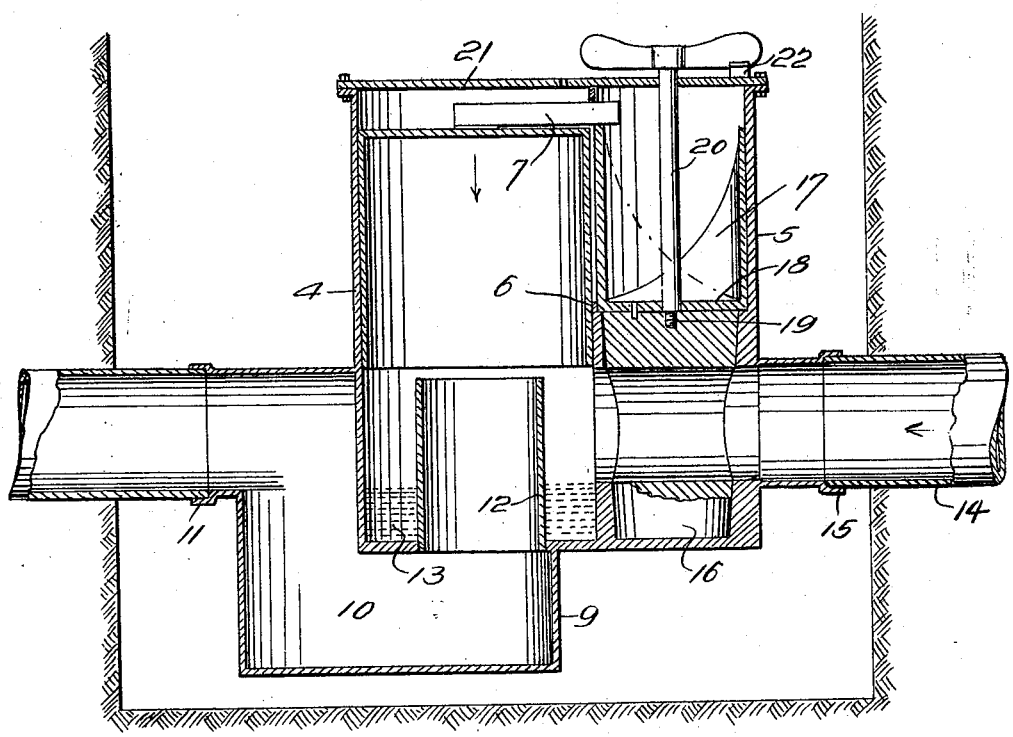
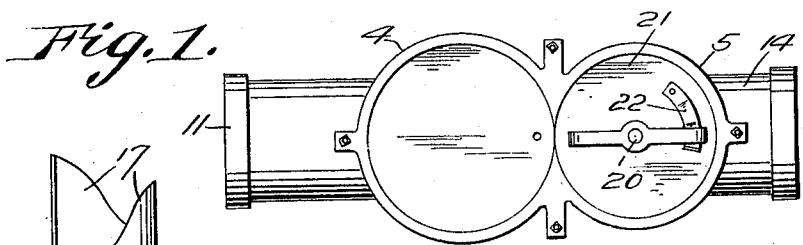
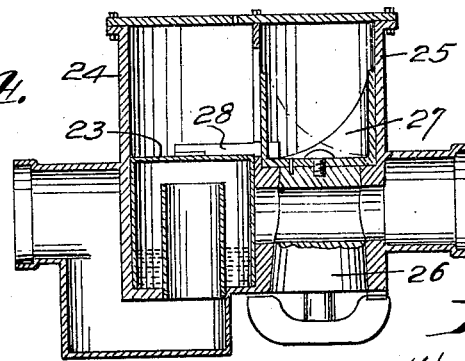
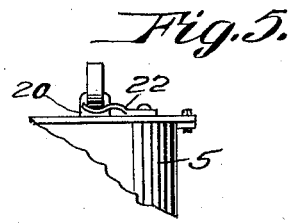

UNITED STATES PATENT OFFICE.

WILLIAM A. DAVENPORT, OF SCRANTON, PENNSYLVANIA, ASSIGNOR OF ONE-HALF TO CHESTER S. DAVIES, OF SCRANTON, PENNSYLVANIA.

POSITIVE AUTOMATIC GAS SAFETY-VALVE AND CONTROL.

1,142,676.  Specification of Letters Patent.  Patented June 8, 1915.

Application filed September 15, 1914. Serial No. 861,766.

*To all whom it may concern:*

Be it known that I, WILLIAM A. DAVENPORT, a citizen of the United States of America, and resident of Scranton, in the county of Lackawanna and State of Pennsylvania, have invented certain new and useful Improvements in Positive Automatic Gas Safety-Valves and Control, of which the following is a specification.

This invention relates to check or safety valves and particularly to novel means for closing a conduit or pipe designed for the passage of gas or the like, the said invention having for its object the provision of novel means whereby the pipe or passage is automatically closed upon the reduction or removal of pressure in the pipe as where the pipe breaks on either side of the valve or the source of supply is cut off; the invention being a safety device as well which may be utilized in connection with gas stoves and illuminating burners, for it occurs sometimes that the pressure is automatically cut off and then reëstablished and during the cutting off of the pressure, the flame is extinguished so that when the pressure or supply is resumed, gas escapes with disastrous results, all of which can be avoided by the interposition of a valve of the character indicated which prevents reëstablishment of communication between the source of supply and the said burners.

A still further object of this invention is to provide novel means for the automatic control of the line or pipe and in conjunction therewith, a manually operated valve by which communication may be interrupted between sections of pipe as where repairs are to be made prior to the accidental shutting off of the pressure, the said valve having means associated therewith for lifting or re-setting the check valve or float or the positively automatically controlled valve.

A still further object of this invention is to provide an automatically controlled check valve having a liquid seal, preferably of oil which will prevent leakage of gas or the like while the said valve is closed, thus guarding against accidental lifting of the said valve from its seat upon the reëstablishment of pressure within the pipe, the object of the invention being that the said check valve shall remain seated until manually operated or lifted into position for the resumption of communication between the sections of the pipe.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a vertical sectional view showing a valve embodying this invention; Fig. 2 illustrates a vertical sectional view of a slightly modified construction; Fig. 3 illustrates a top plan view of the form shown in Fig. 1; Fig. 4 illustrates a perspective view of the float lifting valve; and Fig. 5, illustrates a detail view of the means of holding the manually operated valve.

In these drawings, I have shown a valve casing as comprising a body having two cylindrical sections 4 and 5, the former of which constitutes the housing for the check or float valve and the latter of which constitutes a housing for the manually operated valve and the means associated therewith for moving the check valve. In this specification, I have referred to a "float or check" valve and by these terms I wish to be understood as meaning any element which may be associated with the valve casing, capable of being held elevated by pressure and capable of descending when pressure is removed to close the pipe or duct with which the valve casing is connected. The cylindrical sections are separated by a wall 6 slotted vertically for the passage of an arm 7, which arm is attached at one end to the check valve 8 which, as stated, is slidable in the housing 4.

The lower portion of the body and especially that portion under the housing 4, has a hollow boss 9 which communicates with the delivery pipe 10, which delivery pipe is connected to the coupling 11 formed at one end of the body. The hollow boss is further in communication with an upwardly extending pipe or nipple 12, standing in the housing 4, so that gas may pass through the upper end of the upstanding pipe, downwardly through the hollow boss and thence to the delivery pipe. There is an intervening space between the upstanding pipe and the wall of the housing, the same containing fluid 13, such as oil, into which the lower end of the float or check valve extends when said float or check valve is in its lowermost position or in position to close the upper end of the upstanding pipe.

The supply pipe 14 is connected to the coupling 15 of the cylindrical section 5 and the said cylindrical section 5 constitutes a valve casing with a seat for the valve 16 of the turning plug type, the said valve having a port therethrough which is designed to establish communication between the supply pipe and the cylindrical section 4 or to interrupt the said communication according to the position of the said valve.

It is the purpose of the inventor to provide the valve with a lift for the check valve and to this end the upper end of the said valve is provided with a double cam 17 formed on the plate 18 which plate is secured to the valve by the screw 19. The valve has a stem 20 which projects through the upper wall or top closing plate 21 which is provided for the cylindrical sections and this valve stem has a thumb piece which may be manipulated for turning the valve into the different positions of adjustment. A leaf spring 22 is secured to the top plate and engages the thumb piece so as to hold the valve in open position. The relation of the cams to the port of the valve is such that one of the cams operates to lift the check valve and raises it to the limit of its upward movement at the time that the port in the valve is in registry with the supply pipe, so that when the said check valve is lifted, gas is admitted and the check valve is held elevated by the pressure thereof while the cam is moved out of engagement with the arm of the check valve and clears the said arm to permit the check valve to drop upon the cessation of pressure within the supply pipe.

From an inspection of the drawing and from the foregoing description, it will be apparent that upon manipulating the turn plug of the valve, the cam carried thereby will engage the arm of the check valve, thereby lifting the check valve to its upward limit at which time pressure within the valve casing is sufficient to retain the check valve elevated and it will remain so elevated during the time that the pressure is maintained. Should it be desirable to interrupt the supply of gas, the valve may be manipulated to close the passage or if, while the gas is turned on, there is any accidental interruption of the pressure, the check valve will operate for the purpose intended.

In the modification shown in Fig. 2, the check valve 23 and the cylindrical sections 24 and 25 are the same as shown and described in connection with the illustration in Fig. 1, but in this modification, the valve 26 has its stem extending through the bottom of the cylindrical casing instead of through the top thereof, and the said valve stem has a thumb piece which may be manipulated for turning the valve. In this embodiment of the invention, the said valve is provided with the cams 27 to engage the arm 28 on the check valve and the construction of the other parts of the device is the same as heretofore described.

I claim—

1. In a check valve, a body comprising two cylindrical sections, the said body having a slot between the two sections, a float valve in one of the casings, an arm on the float valve extending through the slot, an upwardly extending pipe in the cylindrical casing containing the check valve, said check valve being adapted to guard the end of said pipe, a seat at the bottom of the last mentioned cylindrical section containing liquid, a port extending from a point externally of the body and communicating with the upwardly extending pipe, a valve in the other cylindrical section for controlling a passage to the first mentioned cylindrical section, and a cam on the said valve for operating the float valve.

2. In a check valve, a body having cylindrical sections separated by a slotted wall, said wall having a port establishing communication between said sections, an upstanding pipe in one of the cylindrical sections, a port leading from the upstanding pipe to the exterior of the said cylindrical section, a bell shape float in the cylindrical section above the pipe, an arm on the float and extending through the slot, a valve in the other cylindrical section for controlling passage of gas from the exterior of said body to the cylindrical section containing the float, and an arm operating means carried by the valve for lifting the float.

3. In a check valve, a body having cylindrical sections separated by a slotted wall, said wall having a port establishing communication between said sections, an upstanding pipe in one of the cylindrical sections, a port leading from the upstanding pipe to the exterior of the said cylindrical section, a bell shaped float in the cylindrical section above the pipe, an arm on the float and extending through the slot, a valve in the other cylindrical section for controlling the passage of gas from the exterior of said body to the cylindrical section containing the float, and a double cam on the valve operative to elevate the float when the valve is open.

In testimony whereof, I affix my signature in the presence of two witnesses.

WILLIAM A. DAVENPORT.

Witnesses:
 CHESTER S. DAVIES,
 LOTTIE E. BARKLEY.

Copies of this patent may be obtained for five cents each, by addressing the "Commissioner of Patents, Washington, D. C."